United States Patent
Schüler et al.

(10) Patent No.: US 6,170,790 B1
(45) Date of Patent: *Jan. 9, 2001

(54) LENGTH ADJUSTMENT DEVICE FOR SEATS, SPECIALLY MOTOR VEHICLE SEATS

(75) Inventors: Rolf Schüler, Heiligenhaus; Joachim Flick, Hückeswagen, both of (DE)

(73) Assignee: Keiper GmbH & Co., Kaiserslautern (DE)

( * ) Notice: Under 35 U.S.C. 154(b), the term of this patent shall be extended for 0 days.

This patent is subject to a terminal disclaimer.

(21) Appl. No.: 09/297,462
(22) PCT Filed: Oct. 24, 1997
(86) PCT No.: PCT/EP97/05889
§ 371 Date: Jul. 13, 1999
§ 102(e) Date: Jul. 13, 1999
(87) PCT Pub. No.: WO98/22306
PCT Pub. Date: May 28, 1998

(30) Foreign Application Priority Data

Nov. 16, 1996 (DE) .............................. 196 47 448

(51) Int. Cl.⁷ .................................................. F16M 13/00
(52) U.S. Cl. ........................ 248/430; 297/341; 297/344.1
(58) Field of Search ..................... 248/430, 429, 248/424; 297/341, 344.1

(56) References Cited

U.S. PATENT DOCUMENTS

| | | |
|---|---|---|
| 2,850,074 | 9/1958 | Silverberg et al. . |
| 4,143,911 | 3/1979 | Sakakibara et al. ............... 297/341 |
| 5,383,640 | 1/1995 | Johnson et al. . |
| 5,765,802 * | 6/1998 | Bostrom et al. .................... 248/575 |
| 5,893,610 * | 4/1999 | Schuler et al. ..................... 297/341 |
| 5,941,494 * | 8/1999 | Garrido ............................ 248/429 |
| 5,971,342 * | 10/1999 | Sakai et al. ....................... 248/430 |
| 6,036,267 * | 3/2000 | Downey ............................ 297/341 |

FOREIGN PATENT DOCUMENTS 4241369  11/1993  (DE) .

* cited by examiner

Primary Examiner—Ramon O. Ramirez
(74) Attorney, Agent, or Firm—Friedrich Kueffner

(57) ABSTRACT

A longitudinal adjusting device for vehicle seats, whose backrest, which is adjustable in inclination positions which are selectable as the case may be, is swivelably connected with a seat part, has running rails and guide rails, wherein the seat part is fastened to the running rails. Each running rail is displaceable longitudinally in one of the guide rails fixed to the vehicle floor. A locking device secures at least one of the running rails to the respective guide rail in selectable longitudinal positions. A spring member supports at least one of the running rails at the guide rail for purposes of a forward displacement of the running rails, wherein the spring member is a spiral spring. A winding drum is rotatably supported on the running rail, wherein a first end of the spiral spring is associated with the running rail and a second end of the spiral spring is associated with the guide rail, wherein the second end of the spiral spring associated with the guide rail is held at the winding drum. A pull rope is fixed with one end to the winding drum and with the other end to the front area of the guide rail.

8 Claims, 2 Drawing Sheets

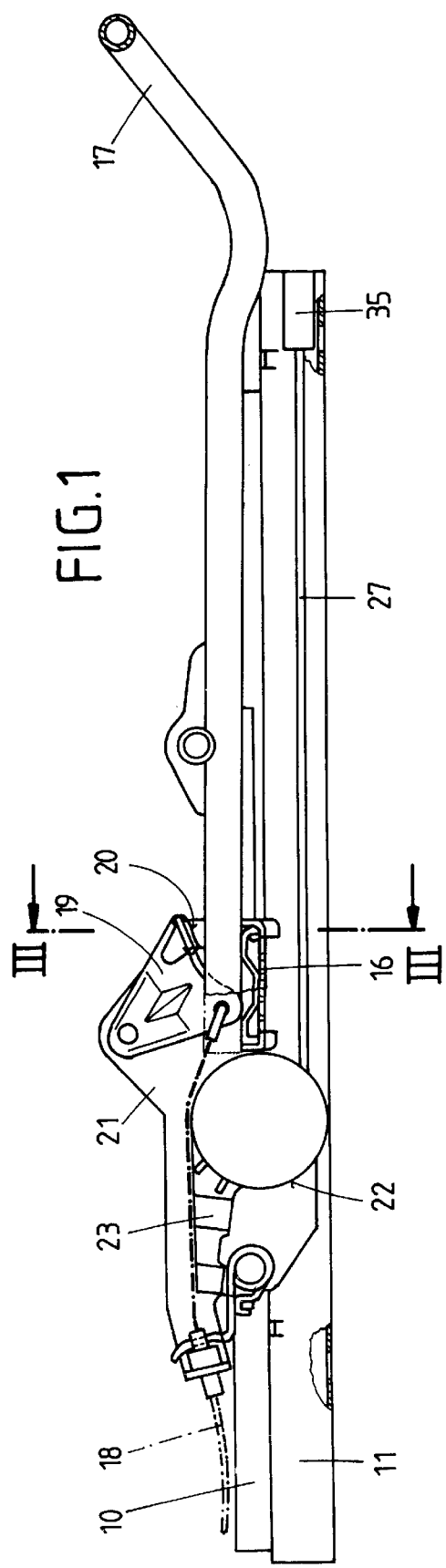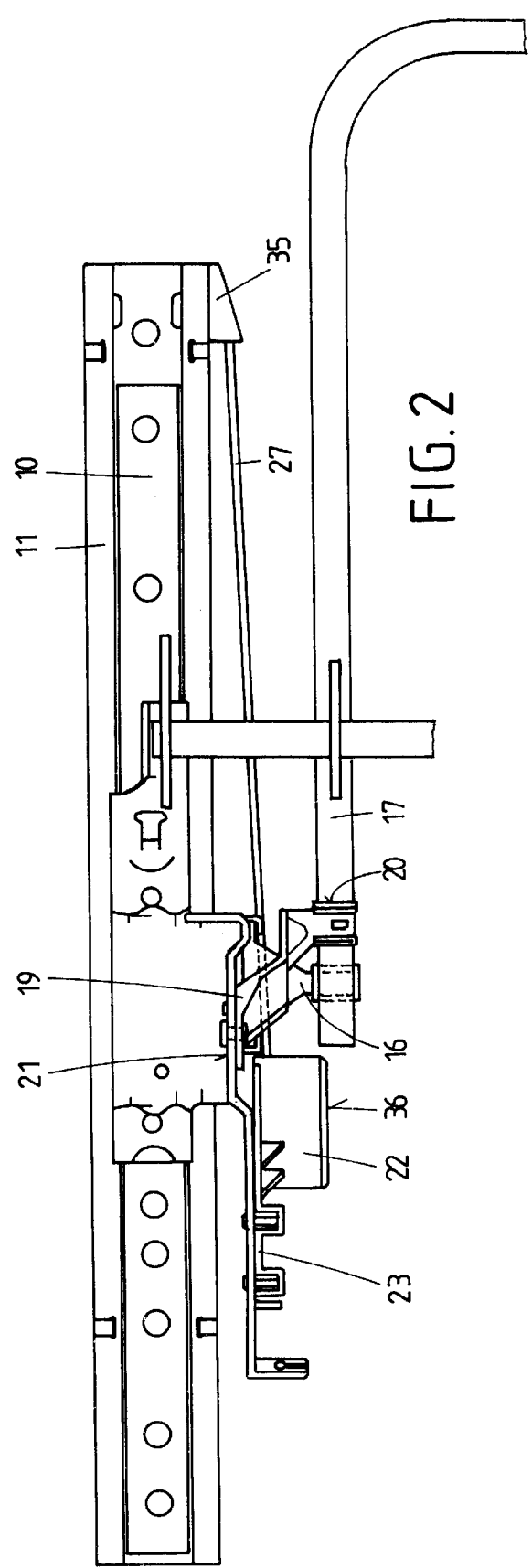

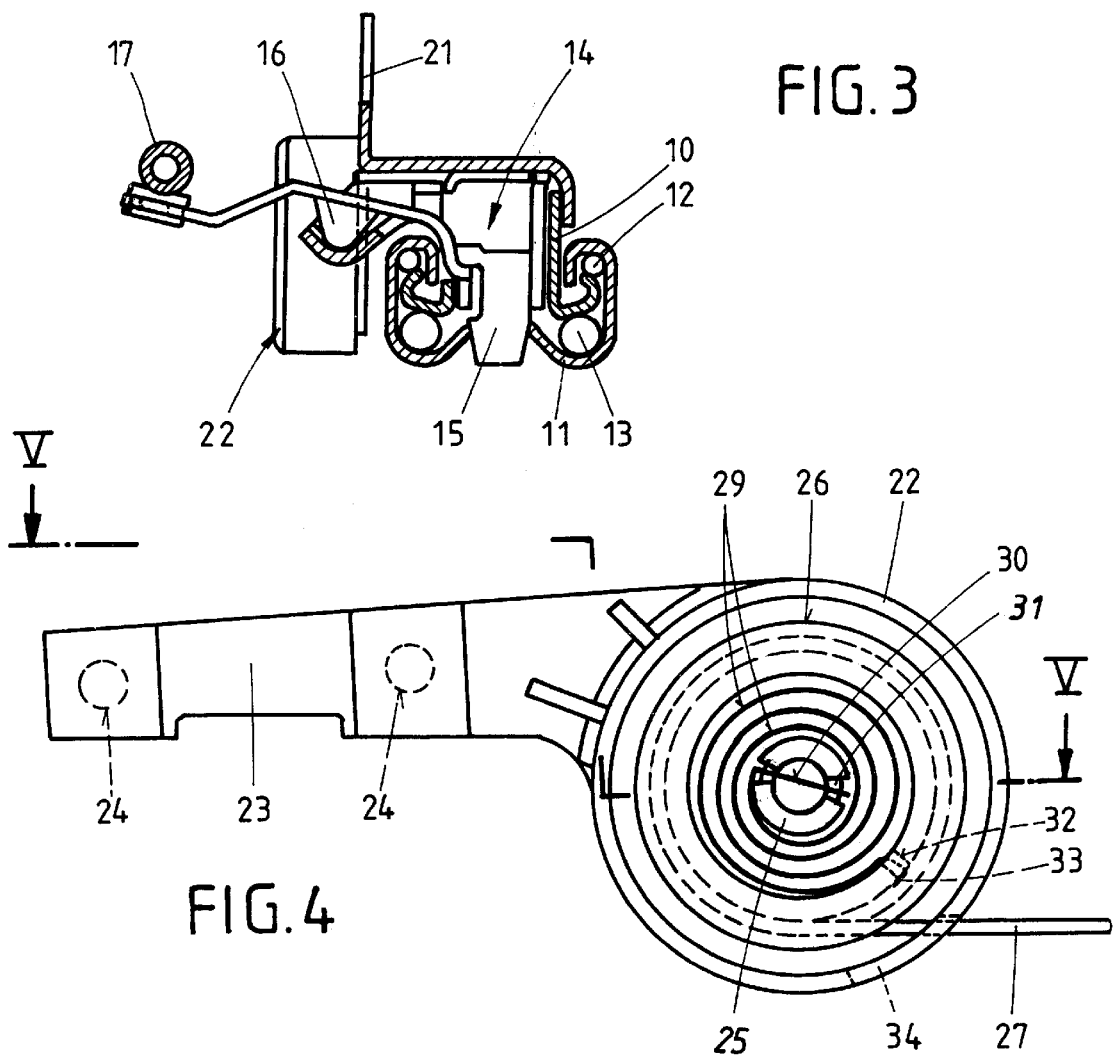
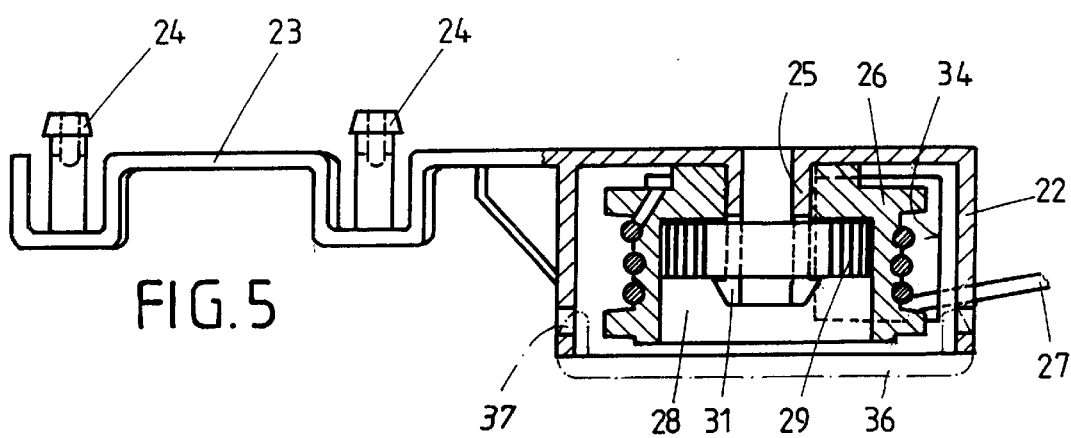

LENGTH ADJUSTMENT DEVICE FOR SEATS, SPECIALLY MOTOR VEHICLE SEATS

BACKGROUND OF THE INVENTION

1. Field of the Invention

The invention is directed to a longitudinal adjusting device for seats, especially motor vehicle seats, whose backrest which is adjustable in selectable inclination positions is swivelably connected with a seat part, and the seat part is fastened to running rails, wherein every running rail is displaceable longitudinally in a guide rail fixed to the vehicle floor and at least one running rail can be secured to the guide rail in selectable longitudinal positions by means of a locking device, and at least one running rail is supported at the guide rail via a spring member for purposes of a forward displacement of the running rails.

2. Description of the Related Art

Longitudinal adjusting devices for seats of the type mentioned above are known in many constructional forms as can be seen, for example, from DE 32 26 198 A1or U.S. Pat. No. 4,143,911. Regardless of whether the displacement of the seat relative to the floor of the vehicle serves only for adjusting the longitudinal position of the seat or, when installed in two-door passenger automobiles, if it also serves to provide more space for rear seat passengers to board the vehicle, a spring element—e.g., an inherently elastic tension member—which reinforces the forward displacing movement of the seat is, as a rule, constructed as a helical tension spring which is connected on one hand with the running rail carrying the seat and, on the other hand, with either an articulation point of the vehicle floor or the guide rail which is fixed to the floor. Of course, it is also known to use helical pressure springs, wherein the articulation points are then reversed in a corresponding manner. Since a relatively large spring path is required for the longitudinal displacement of the seat, the selection of the springs according to their spring characteristic proves difficult inasmuch as the effective force should change only insignificantly from the start to the end of the displacing movement of the seat. However, this conflicts with the characteristics of helical tension springs and helical pressure springs of the type mentioned above which start at zero at the beginning of the spring path and, as the spring path advances, increase steadily to a maximum value at the end of the spring path. In order to achieve usable force ratios, springs of this type must have many turns and therefore have considerable length. This in turn requires a large space requirement for accommodating such helical tension springs and helical pressure springs.

SUMMARY OF THE INVENTION

It is the object of the invention to improve the spring device for reinforcing the forward displacement movement of the seat with its longitudinal adjusting device with respect to space requirement and the returning or restoring force. This object is met, according to the invention, in that a spiral spring is used as a spring member. Since the spiral spring takes up less space and, moreover, can be secured to a selectable location on the running rail, no significant installation space is taken up for this kind of return spring device. Further, the spiral spring can be tensioned in such a way that only a small rise or fall in force takes place over its useful range. In this respect, it will be apparent that the spiral spring, instead of the running rail, can also be associated with the floor of the vehicle or with the guide rail when the fixing point of the rope pull of the running rail is correspondingly associated with the return direction.

The spiral spring, as an automatically unwinding structural component part, can be fastened to the guide rail by one of its ends and to the running rail by its other end. However, as a rule, one end of the spiral spring is held in a stationary manner indirectly or directly at the rear area of the running rail, while the other end is held at a coiling or winding drum which is supported so as to be rotatable at the running rail, wherein one end of a pull rope is fixed to the winding drum and the other end of the pull rope is fastened to the front area of the guide rail.

A space-saving arrangement of the return spring device can be achieved in that the spiral spring is arranged in a hollow space of the winding drum and is connected by its inner end with a mandrel which is associated in a stationary manner with the running rail and on which the winding drum is mounted. The winding diameter can have either a constant or a changeable radius. For this purpose, a constructional unit can be advantageously provided in that the mandrel is a stationary, concentric component part of a can-like housing which surrounds the winding drum and which has, at its outer circumference, a slot for the passage of the pull rope fastened to the winding drum. For a reliable connection of the housing with the running rail, the housing may advantageously have, at its side wall, a carrying arm whose catch projections penetrate through bore holes in a holding cheek that is secured to the running rail.

An encapsulation of the constructional unit can be achieved so as to be substantially protected from soiling in that the housing is closable by means of a cover covering the spiral spring and the winding drum, wherein the housing, together with the spiral spring and the winding drum, forms a constructional unit.

In this case, the winding drum has, at its inner circumference, a receptacle for securing the outer end of the spiral spring whose inner end engages by a bent portion in a slot of the mandrel enclosed by the spiral spring.

BRIEF DESCRIPTION OF THE DRAWINGS

The invention is shown in an embodiment example in the drawing and is described more fully hereinafter.

FIG. 1 shows the outside pair of rails of a vehicle seat having a longitudinal adjusting device in a side view as seen from the inner side of the seat;

FIG. 2 shows the pair of rails shown in FIG. 1 with the seat longitudinal adjusting device in a top view;

FIG. 3 shows a cross section of the pair of rails according to line III—III of FIG. 1;

FIG. 4 shows the housing receiving the spiral spring and winding drum, wherein the cover part is removed, in a view analogous to FIG. 1, but enlarged in relation to it;

FIG. 5 shows the housing which can be seen from FIG. 4 and which receives the winding drum and the spiral spring in a partial top view shown in section along line V—V in FIG. 4.

DESCRIPTION OF THE PREFERRED EMBODIMENTS

The underside of a seat frame, not shown, is connected on both longitudinal sides of the seat with a running rail 10 which engages in a guide rail 11 secured to the vehicle floor and is supported so as to be longitudinally displaceable at this guide rail 11 in the illustrated embodiment example via rolling bodies 12 and 13. At its curved base, the guide rail 11 has openings, not described more fully, which are arranged at a distance one behind the other in the longitudinal direction and which form a row of teeth. At least one of a plurality of locking claws 15 engage in these openings, wherein the locking claws 15 are a component part of a locking device 14 which is secured to the running rail 10 and which can be disengaged against spring action by a transverse lever 16, likewise supported at the running rail 10, by actuating a U-shaped lever 17 that is likewise mounted at the running rail 10. However, the locking device 14 belonging to the seat longitudinal adjusting device can also be released by an actuating lever arranged in a known manner at the backrest in that a release lever 19 can be controlled via a Bowden cable 18 in such a way that this release lever 19 presses down the transverse lever 16 with its supporting thumb 20 via the U-shaped lever 17 in order to disengage the locking claws 15. In this connection, it will be apparent that the locking of the seat part, not shown, in relation to the backrest, also not shown, is simultaneously released as well, so that the backrest can be swiveled forward and the running rail 10 carrying the seat can also be slid forward. The release lever 19 is mounted at a holding cheek 21 which, as a structural component part that is bent at an angle, is fixedly connected with the running rail 10. This holding cheek 21 forms an abutment for the Bowden cable 18 at its rear end and, at the other side, receives a can-like housing 22 which is fixed, by a carrying arm 23 connected in one piece therewith, to the side cheek 21 by means of catch projections 24 penetrating through its bore holes. Located in the center of the can-like housing 22 is a mandrel 25 which projects toward the interior of the housing in the manner of an axle, wherein a winding drum 26 is mounted on the mandrel 25 so as to be rotatable. A pull rope 27 is fastened to this winding drum and can wind around the outer circumference of the winding drum 26 by a plurality of turns. In the view shown in FIG. 5, all of the turns of the winding drum 26 are taken up by the pull rope 27, which corresponds to a position of the seat in the fully pushed forward position, so that, in contrast to the view in FIGS. 1 and 2, the running rail 10 projects out in the front relative to the guide rail 11. In the position of the running rail 10 in the guide rail 11 according to FIGS. 1 and 2, the pull rope 27 is unwound from the winding drum 26 to a great extent. The winding drum 26 having a hollow space 28 concentric to the winding circumference receives a spiral spring 29 in this hollow space, which spiral spring 29 penetrates by a bend 30 of its inner end through a slot 31 of the mandrel 25 and is secured thereto. The outer end of the spiral spring 29 is bent to form a hook 33 and penetrates a receptacle 32 in the drum jacket for fixing to the winding drum 26. The pull rope 27 which is secured to the winding drum penetrates a slot 34 in the jacket of the housing 22 and is fixed to the front end of the guide rail 11 by its free end by means of a connection piece 35. For purposes of encapsulating the winding drum 26 and spiral spring 29, the front opening of the can-like housing 22 can be closed by means of a cover 36 shown in dash-dot lines in FIG. 5. As can be seen from FIG. 5, this cover 36 can be held in its locked position by catch fingers 37 which penetrate into openings in the jacket of the housing.

When the seat is pushed toward the rear in the present embodiment example, the running rail 10 carries the housing 22 along to the rear as well, so that the pull rope 27 unwinds from the winding drum 26 against the force of the spiral spring. The farther the running rail 10 is displaced toward the rear, the more the spiral spring 29 is tensioned. In this connection, the tensioning force of the spiral spring is configured in such a way that it reinforces the forward running of the seat when the locking claws 15 are disengaged from the guide rail 11 until the user no longer needs to apply any significant force to push the seat forward. In so doing, the spiral spring 29 rotates the winding drum 26 in a direction such that the pull rope 27 is wound on the jacket of the winding drum while the running rail 10 runs forward at the same time.

As was already mentioned, the embodiment form shown and described above represents the invention only by way of example and the invention is in no way limited exclusively to it. On the contrary, there are many other conceivable modifications and arrangements of the subject matter of the invention. For example, it will be apparent that a reversal of the movement directions is possible, should this be desired, in that the spiral spring 29 is coiled in the opposite direction and locked, while the pull rope 27 can also wind off from the winding drum in the opposite direction. In order to exert influence with respect to evening out the force reinforcing the seat movement, the outer contour of the winding drum 26 can be shaped in such a way that the pull rope 27 is constantly wound off and on along a radius of the winding drum jacket that changes relative to the axis of rotation of the winding drum. For this purpose, the outer surface of the winding drum 26 could also have a conical shape, for example. Finally, the spiral spring also need not necessarily be arranged in the hollow space 28 of the winding drum, but can also be arranged beside the hollow space 28. Further, the connection between the spiral spring 29 and the housing 22 or its mandrel 25 can also be carried out in a manner other than that which is shown and described above. For example, it is conceivable for the adjustment of the spring tension to fasten the inner end of the spiral spring 29 to a sleeve which is rotatable relative to the housing but which can be fixed with respect to the housing in order to adjust the desired spring tension after assembly. Moreover, the fastening of the cover 36 is not limited to the embodiment form described above; rather, the cover can also be connected with the housing 22 in some way other than clipping or snapping, for example, by screwing. The fastening of the housing 22 to the running rail 10 is also not limited to the above-described embodiment form; rather, the housing 22 can deviate from the above-described construction with respect to its shape as well as with respect to its type of fastening. In this respect, it is possible that the housing 22 of the running rail 10 can also be fastened by screwing, riveting or the like. Finally, it is also conceivable to fasten the housing 22 with the winding drum 26 located therein and the spiral spring 29 to the guide rail or also to the floor of the vehicle when the connection piece 35 of the pull rope 27 is fixed to the running rail. All of the novel features mentioned in the description and/or shown in the drawings are substantial to the invention even if they are not expressly claimed in the claims.

Reference Numbers:

10 running rail
11 guide rail
12 rolling body
13 rolling body
14 locking device
15 locking claw
16 transverse lever
17 U-shaped lever
18 Bowden cable
19 release lever
20 support thumb
21 holding cheek
22 housing
23 carrying arm Reference Numbers:

24 catch projection
25 mandrel
26 winding drum
27 pull rope
28 hollow space
29 spiral spring
30 bend
31 slot
32 receptacle
33 hook
34 slot
35 connection piece
36 cover
37 catch finger

What is claimed is:

1. Longitudinal adjusting device for vehicle seats, whose backrest, which is adjustable in inclination positions which are selectable as the case may be, is swivelably connected with a seat part, wherein the longitudinal adjusting device comprises:
   running rails (10) and guide rails (11), wherein the seat part is configured to be fastened to the running rails (10), wherein each running rail (10) is displaceable longitudinally in one of the guide rails (11) configured to be fixed to the vehicle floor,
   a locking device (14) configured to secure at least one of the running rails (10) to the respective guide rail (11) in selectable longitudinal positions,
   a spring member configured to support at least one of the running rails (10) at the respective guide rail (11) for purposes of a forward displacement of the running rails (10), wherein the spring member is a spiral spring (29),
   a winding drum (26) configured to be rotatably supported on the running rail (10), wherein a first end of the spiral spring (29) is associated with the running rail (10) and a second end of the spiral spring (29) is associated with the guide rail (11), wherein the second end of the spiral spring (29) associated with the guide rail is held at the winding drum (26),
   a pull rope (27) fixed with one end to the winding drum (26) and with the other end to a front area of the guide rail (11).

2. Longitudinal adjusting device according to claim 1, comprising a mandrel (25) connected to the running rail (10), wherein the winding drum (26) is rotatably mounted on the mandrel (25), wherein the spiral spring (29) is arranged in a hollow space (28) of the winding drum (26) having the winding diameter and is secured by the first end to the mandrel (25).

3. Longitudinal adjusting device according to claim 2, wherein the winding drum (26) does not have a constant winding diameter.

4. Longitudinal adjusting device according to claim 2, comprising a can-shaped housing configured to surround the winding drum (26), wherein the mandrel (25) is a stationary, centric component part of the housing, wherein the housing has, at its outer circumference, a slot (34) for the passage of the pull rope (27) fastened to the winding drum (26).

5. Longitudinal adjusting device according to claim 4, wherein the housing (22) has, at its side wall, a carrying arm (23) with catch projections (24), wherein the running rail (10) has a holding cheek (21), and wherein the catch projections (24) penetrate through bore holes in the holding cheek (21).

6. Longitudinal adjusting device according to claim 4 wherein the housing (22) is closable by means of a cover (36) covering the spiral spring (29) and the winding drum (26), wherein the housing (22), together with the spiral spring (29) and the winding drum (26), forms a constructional unit.

7. Longitudinal adjusting device according to claim 2, wherein the winding drum (26) has, at its inner circumference, a receptacle (32) configured to secure the second end of the spiral spring (29), wherein the first end has a bent portion configured to engage a slot (31) of the mandrel (25) enclosed by the spiral spring (29).

8. Longitudinal adjusting device according to claim 2, comprising an adjusting element which is mounted on the mandrel (25) or in the housing (22) so as to be rotatable but fixable, wherein the first end of the spiral spring (29) is fixed to the adjusting element.

* * * * *